US012633686B2

(12) United States Patent
Kim et al.

(10) Patent No.: US 12,633,686 B2
(45) Date of Patent: May 19, 2026

(54) POWER CABLE SYSTEM HAVING DIFFERENT CONDUCTOR CONNECTING PART

(71) Applicant: LS CABLE & SYSTEM LTD., Anyang-si (KR)

(72) Inventors: Jeong Ik Kim, Seongnam-si (KR); Sangyum Kim, Anyang-si (KR); Min Su Kang, Gunpo-si (KR); Sung Ho Hong, Seoul (KR)

(73) Assignee: LS CABLE & SYSTEM LTD., Anyang-si (KR)

( * ) Notice: Subject to any disclaimer, the term of this patent is extended or adjusted under 35 U.S.C. 154(b) by 203 days.

(21) Appl. No.: 18/696,697

(22) PCT Filed: Oct. 7, 2022

(86) PCT No.: PCT/KR2022/015178
§ 371 (c)(1),
(2) Date: Mar. 28, 2024

(87) PCT Pub. No.: WO2023/059145
PCT Pub. Date: Apr. 13, 2023

(65) Prior Publication Data

US 2024/0405455 A1 Dec. 5, 2024

(30) Foreign Application Priority Data

Oct. 8, 2021 (KR) ........................ 10-2021-0133831
Oct. 7, 2022 (KR) ........................ 10-2022-0128361

(51) Int. Cl.
*H01R 4/62* (2006.01)
*H01R 4/60* (2006.01)
*H01R 43/02* (2006.01)

(52) U.S. Cl.
CPC ............... *H01R 4/625* (2013.01); *H01R 4/60* (2013.01); *H01R 43/0214* (2013.01); *H01R 2201/20* (2013.01)

(58) Field of Classification Search
CPC ...... H01R 4/625; H01R 4/60; H01R 43/0214; H01R 2201/20; H01R 4/02; H01R 4/62;
(Continued)

(56) References Cited

U.S. PATENT DOCUMENTS 3,897,623 A * 8/1975 Tasaki .................... B23K 20/12
228/114.5
5,973,287 A * 10/1999 Takano ............. H01R 43/0214
219/56
(Continued)

FOREIGN PATENT DOCUMENTS

JP 2016087688 A 5/2016
JP 2020135938 A 8/2020
(Continued)

OTHER PUBLICATIONS

International Search Report for related International Application No. PCT/KR2022/015178; action dated Apr. 13, 2023; (3 pages).
(Continued)

*Primary Examiner* — Angel R Estrada
(74) *Attorney, Agent, or Firm* — K&L Gates LLP

(57) ABSTRACT

The present disclosure relates to a power cable system capable of determining the possibility of brittle fracturing of a different conductor connecting part of power cables due to tensile force applied to the different conductor connecting part, the power cable system comprising: a first conductor constituting a first power cable; a second conductor constituting a second power cable; and the different conductor connecting part formed by bonding the first conductor and the second conductor by means of resistance welding, wherein the average thickness of an intermetallic compound layer formed on the bonding surface of the different conductor connecting part is 10 μm or less, which is the critical average thickness at which a brittle fracture occurs during a tensile test.

5 Claims, 10 Drawing Sheets

(58) Field of Classification Search

CPC ...... H01R 43/02; H01R 13/03; H01R 13/187; H01B 1/02; H01B 1/023; H01B 1/026; H01B 9/00; B23K 11/04; B23K 11/0026; B23K 11/002; B23K 1/002; B23K 10/00; B23K 11/00; B23K 9/23; B23K 9/167; B23K 20/12; H02G 15/08; H02G 15/18; H02G 15/28

USPC .......................................... 174/84 R, 68.1, 85

See application file for complete search history.

(56) References Cited

U.S. PATENT DOCUMENTS

| | | | | |
|---|---|---|---|---|
| 5,977,508 A * | 11/1999 | Takano | B23K 11/0026 219/91.23 |
| 9,266,188 B2 * | 2/2016 | Oda | C22C 21/18 |
| 10,516,220 B2 * | 12/2019 | Harms | B23K 20/002 |
| 12,191,047 B2 * | 1/2025 | Wang | H01R 4/625 |
| 2016/0122842 A1 | 5/2016 | Oda et al. | |

FOREIGN PATENT DOCUMENTS

| | | | |
|---|---|---|---|
| KR | 20110072892 | A | 6/2011 |
| KR | 20120004111 | A | 1/2012 |
| KR | 20200069967 | A | 6/2020 |
| WO | 2013167609 | A1 | 11/2013 |

OTHER PUBLICATIONS

Written Opinion for related International Application No. PCT/KR2022/015178; action dated Apr. 13, 2023; (3 pages).

Extended European Search Report for related European Application No. 22878966.5; action dated Sep. 10, 2025; (8 pages).

* cited by examiner

POWER CABLE SYSTEM HAVING DIFFERENT CONDUCTOR CONNECTING PART

CROSS-REFERENCE TO RELATED APPLICATIONS

The present application is a National Stage of International Application No. PCT/KR2022/015178 filed on Oct. 7, 2022, which claims the benefit of Korean Patent Application No. 10-2021-0133831, filed on Oct. 8, 2021, and Korean Patent Application No. 10-2022-0128361, filed Oct. 7, 2022, filed with the Korean Intellectual Property Office, the entire contents of each hereby incorporated by reference.

FIELD

The present disclosure relates to a power cable system having a different conductor connecting part. More specifically, the present disclosure relates to a power cable system capable of determining the possibility of brittle fracture of the connecting part due to a tensile force applied to the different conductor connecting part of a power cable.

BACKGROUND

Generally, a power cable includes a conductor and an insulator, with the conductor requiring high electrical conductivity characteristics to minimize electrical energy loss. Copper and aluminum are both excellent electrical conductors and cost-competitive materials for conductors. With the exception of density, copper is superior in electrical and mechanical properties, so copper has been used primarily for conductors for power cables, and aluminum conductors have been used to a limited extent for overhead transmission lines, where lightweight properties are important.

Recently, the price of copper is 4 to 6 times higher than the same weight of aluminum due to the increase in the price of copper raw materials, so the demand for aluminum conductors in power cables is increasing. As a conductor material, it has the characteristics that copper is more conductive than aluminum but more expensive, and aluminum is less conductive than copper but less expensive.

Since copper has been mainly applied to conductors for conventional cables, the application of aluminum to conductors for cables is expected to significantly increase the demand for direct connecting part of copper and aluminum conductors in the connection process between cables applied with copper conductors and cables applied with aluminum conductors.

Therefore, the demand for a different conductor connecting part connecting copper and aluminum conductors is expected to increase in the future. However, at the connecting part interface between different conductors, an intermetallic compound layer is generated and grows, which degrades electrical and mechanical properties. For example, in case that the intermetallic compound layer has grown beyond a critical thickness, the different conductor connecting part is at risk of brittle fracture when a tensile force is applied to the different conductor connecting part.

In particular, with the recent increase in demand for long-distance power transmission, direct current transmission is being actively researched to reduce transmission losses. It is known that the growth of the intermetallic compound layer is accelerated by the electromigration effect, a phenomenon of material movement due to the continuous movement of ions in the conductor that occurs due to the transfer of momentum between conduction electrons and scattered atomic nuclei in the metal under the condition of direct current electrical application.

Meanwhile, for the conductors of power cables, the heating temperature of the conductors may vary depending on the conductor diameter and the amount of power, and brittle fracture of the different conductor connecting part due to the tensile force generated during the endurance life span required for the power cable needs to be prevented. In addition, unlike underground power cables that are buried in the ground, dynamic submarine power cables applied to offshore wind power generation, which are increasingly in demand recently, need more protection against brittle fracture of the different conductor connecting part due to the additional tensile forces generated by external forces as the cable flows in seawater.

Therefore, it is necessary to provide meaningful guidelines for the limit thickness or critical value of the intermetallic compound layer that can prevent brittle fracture.

SUMMARY

The present disclosure has been made an effort to solve the problem of providing a power cable system capable of determining the possibility of brittle fracture of a connecting part due to a tensile force applied to a different conductor connecting part of a power cable.

To solve the above-mentioned objects, there is provided a power cable system including a cable connection part in which a first power cable and a second power cable are connected, the power cable system may include: a first conductor constituting the first power cable: a second conductor constituting the second power cable, the second conductor being made of a material different from the first conductor; and a different conductor connecting part, in which the first conductor and the second conductor are bonded by resistance welding, in which the different conductor connecting part includes an intermetallic compound layer formed as a result of a material migration phenomenon at bonding surfaces of the first conductor and the second conductor, and in which an average thickness, as measured by the following reference, of the intermetallic compound layer is less than or equal to 10 μm, which is a critical average thickness at which brittle fracture occurs in a tensile test.

REFERENCE

The average thickness of the intermetallic compound layer is an average of thicknesses of the intermetallic compound layer at a center point, an outermost point, and a quarter midpoint between the center point and the outermost point of the bonding surface of the first conductor and the second conductor.

In addition, the average thickness of the intermetallic compound layer may be greater than 2.5 μm.

Further, the first conductor may be made of copper or a copper alloy material, and the second conductor may be made of aluminum or an aluminum alloy material.

Here, the intermetallic compound layer may include at least one of an $Al_2Cu$ layer, an AlCu layer, an $Al_2Cu_3$ layer, and an $Al_4Cu_9$ layer.

In addition, a cross-sectional area of the conductor at the connecting part of the first conductor and the second conductor may be equal to or greater than 800 $mm^2$.

Further, the first conductor and the second conductor may be circular compressed conductors or flat conductors with a plurality of strands compressed into a circular shape.

In addition, the first conductor may be bonded with the second conductor in a state where the connecting part is cut to remove voids in the bonding surface after homogeneous conductors are bonded.

According to present disclosure, it is possible to provide a power cable system that can determine whether brittle fracture occurs due to a tensile force applied to a different conductor connecting part during long-term use or even in a seabed environment where the power cable may move.

In addition, according to the power cable system according to the present disclosure, even when an intermetallic compound layer with an average thickness exceeding a conventionally known critical average thickness of 2.5 μm is identified or predicted, it can be determined that the risk of brittle fracture of a joint is not significant, thereby minimizing unnecessary waste of costs, such as shortening the durable lifespan in consideration of brittle fracture or making separate design changes to prevent the brittle fracture.

DETAILED DESCRIPTION

Figure 1:
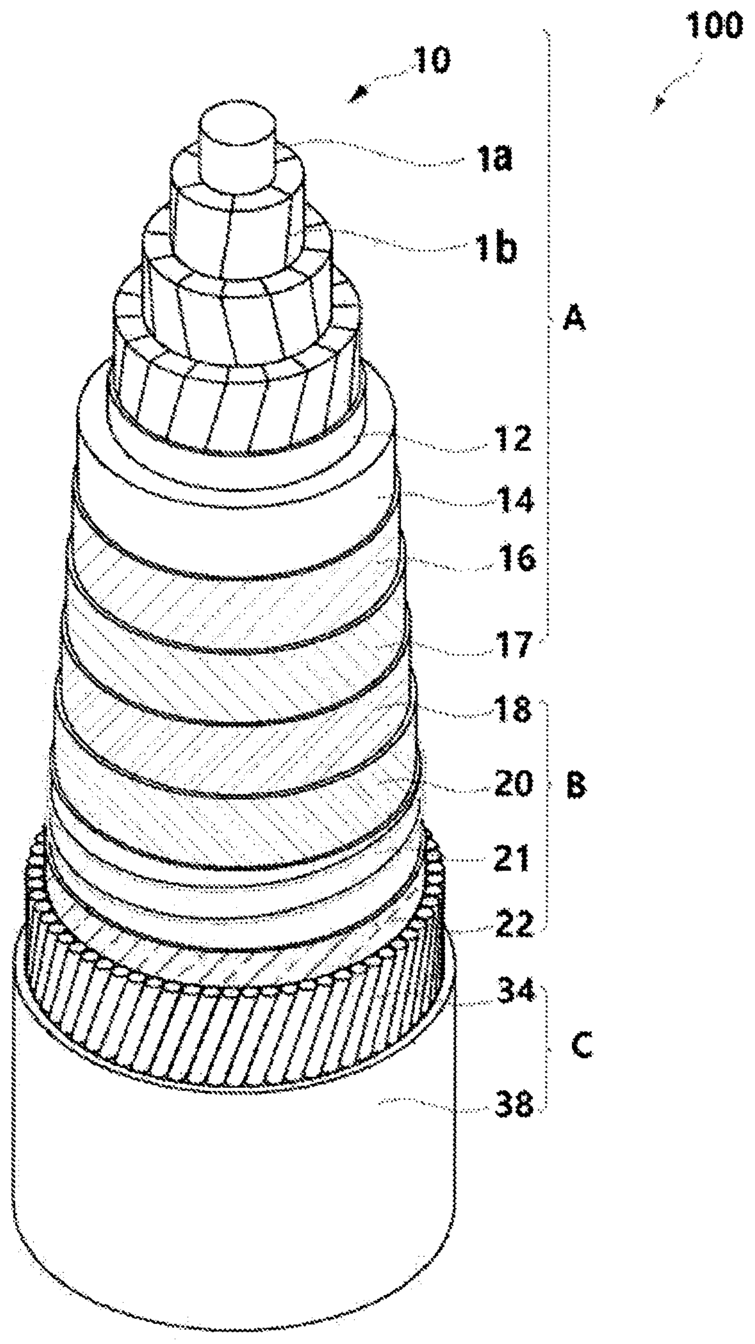
FIG. 1 illustrates a multi-stage stripped perspective view of one embodiment of a power cable.

Hereinafter, exemplary embodiments of the present disclosure will be described in detail with reference to the accompanying drawings. However, the present disclosure is not limited to the exemplary embodiments to be described below and may be specified as other aspects. On the contrary, the embodiments introduced herein are provided to make the disclosed content thorough and complete, and sufficiently transfer the spirit of the present disclosure to those skilled in the art. Like reference numerals indicate like constituent elements throughout the specification.

FIG. 1 illustrates a multi-stage stripped perspective view of one embodiment of a power cable.

A power cable 100 is provided with a conductor 10 in a center portion thereof. The conductor 10 serves as a passageway through which the current flows, and may be configured, for example, as copper (including copper alloys) or aluminum (including aluminum alloys). The conductor 10 may be a flat conductor 10 having a circular central strand 1*a* and a flat strand layer comprising flat strands 1*b* stranded to wrap around the circular central strand 1*a* and having an overall circular cross-section, as illustrated in FIG. 1. The conductor may also be configured as a circularly compressed conductor in which a plurality of circular strands are circularly compressed.

The conductor 10 may have an uneven electric field due to a non-smooth surface thereof, and is partially vulnerable to corona discharge. In addition, the insulation performance may be degraded when voids are formed between the surface of the conductor 10 and an insulation layer 14 described below. To solve the above problems, the conductor 10 may be provided with an inner semi-conductive layer 12 constituted of a semi-conductive material such as semi-conductive carbon paper or the like on the outside of the conductor 10.

The inner semi-conductive layer 12 evenly distributes the charge on the surface of the conductor, thereby uniformizing the electric field and improving the insulation strength of the insulation layer 14 described below. Further, the inner semi-conductive layer 12 may perform a function of preventing the formation of a gap between the conductor 10 and the insulating layer 14, thereby preventing corona discharge and ionization.

The outer side of the inner semi-conductive layer 12 is provided with the insulation layer 14. Paper insulation or a resin material (XLPE, etc.) is mainly applied to the insulation layer 14 of the power cable.

The insulation layer of the power cable illustrated in FIG. 1 describes an example in which the insulation layer is constituted of a polymeric resin material, but the insulation layer may be applied with paper insulation.

The outside of the insulation layer 14 may be provided with an outer semi-conductive layer 16, and a moisture absorbing portion 17 may be provided on the outer side of the outer semi-conductive layer 16 to prevent moisture from penetrating into the cable.

A cable protection portion B is provided on the outside of a cable core portion A configured as described above, and a submarine power cable 100 laid on the seabed may be further provided with a cable armor portion C. The cable protection portion B and cable armor portion C protect the core portion A from various environmental factors such as moisture ingress, mechanical damage, and corrosion that can affect the power transmission performance of the cable.

The cable protection portion B includes a metallic sheath 18 and a polymeric sheath 20 to protect the cable from accidental currents, external forces, or other outside environmental factors.

The power cable may be a power cable that is laid above ground or within an underground pipeline. In addition to underground or underground pipelines, the power cable may also be a power cable installed underwater, such as in a river or ocean (hereinafter referred to as a "submarine power cable"). The submarine power cable may have a different structure than the underground power cable to adapt to the harsh underwater environment and protect the cable.

In addition, since the power cable 100 laid on the seabed is vulnerable to damage by a ship's anchor or the like, and may also be damaged by a bending force caused by a current or wave or the like, a friction force with the seabed surface or the like, the cable armor portion C may be further provided on the outside of the cable protection portion B to prevent such damage.

The cable armor portion C may include a metal armor layer 34 and a serving layer 38, and may perform the function of enhancing the mechanical properties and performance of the power cable 100, as well as further protecting the cable from external forces.

When the power cable is not installed underwater, such as on the seabed, but is laid above ground or in an underground pipeline, a portion of the cable protection portion B and the cable armor portion C may be omitted and the polymeric sheath 20 may be configured as a cable jacket.

When these power cables are laid, intermediate connections may be performed at intervals of several hundred meters or kilometers.

Each of the interconnected pairs of power cables may be configured such that the conductors are aluminum series or copper series, depending on the respective laying environment.

That is, for submarine power cables where heat generation is not a problem, aluminum-based conductors may be used, and for power cables that are laid underground after connection, copper conductors may be used, and when connecting each power cable, the copper and aluminum conductors may be bonded by methods such as resistance welding.

When the different conductors are bonded as described above, an intermetallic compound layer may be formed on the bonding surfaces between the different conductors as described above, and such intermetallic compound layer may cause brittle fracture when a tensile force is applied to the different conductor connecting part.

Here, the "different conductor connecting part" may refer to a region in which different first and second conductors are bonded by recrystallization or the like around the bonding surfaces during the bonding process, and may be defined as a region including an intermetallic compound layer.

In general, the conductor of the cable is mainly applied as a circularly compressed conductor formed by circularly compressing a stranded conductor or a flat conductor as illustrated in FIG. 1, but since the growth of the intermetallic compound layer is similar on the bonding surfaces of different conductors, the test examples illustrated in FIGS. 2 to 7 were tested using a circular bar conductor for convenience of testing.

Hereinafter, the effect of the intermetallic compound layer on the different conductors bonded by resistance welding is described.

Figure 2:
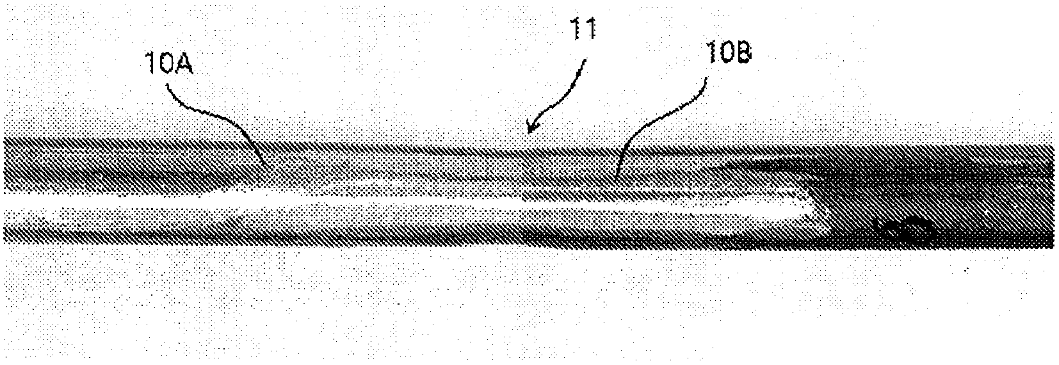
FIG. 2 illustrates a state in which an aluminum conductor and a copper conductor are bonded by resistance welding.
Figure 3:
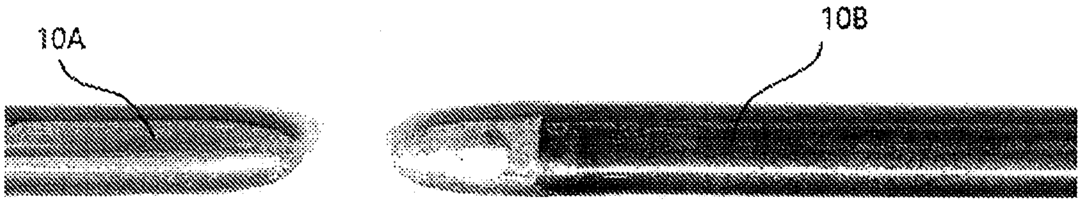
FIG. 3 illustrates a state in which ductile fracture has occurred in a tensile test with the aluminum conductor and the copper conductor bonded by resistance welding.
Figure 4:
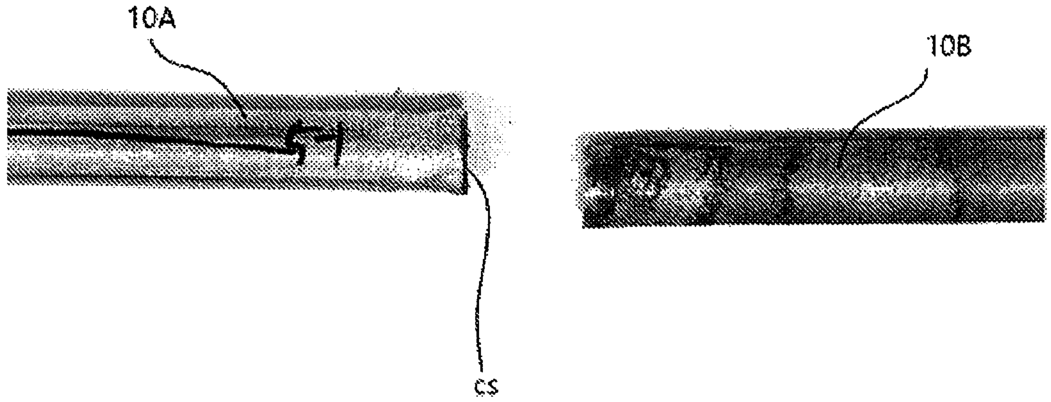
FIG. 4 illustrates a state in which brittle fracture has occurred in a tensile test of a conductor connecting part of a power cable with different conductors.

FIG. 2 illustrates a state in which an aluminum conductor 10A and a copper conductor 10B are bonded by resistance welding, FIG. 3 illustrates a state in which ductile fracture has occurred in a tensile test with the aluminum conductor 10A and the copper conductor 10B bonded by resistance welding, and FIG. 4 illustrates a state in which brittle fracture has occurred in a tensile test with the aluminum conductor 10A and the copper conductor 10B bonded by resistance welding.

With reference to FIG. 2, in order to bond the aluminum conductor 10A and the copper conductor 10B, the different conductor connecting part 11 may be constituted by resistance welding in a state where the respective ends thereof are in contact with each other.

For example, the different conductor connecting part 11 is in a processed surface state to facilitate observation of the intermetallic compound layer after bonding.

In a tensile test in which the bonded aluminum conductor 10A and copper conductor 10B are pulled from both ends, when the different conductor connecting part 11 is properly bonded without problems, ductile fracture occurs in the region of the metal with lower tensile strength, i.e., the aluminum conductor, as illustrated in FIG. 3.

Here, ductile fracture means a fracture in which plastic deformation occurs prior to failure or fracture, and in the case of ductile fracture occurring during tensile testing, it means a fracture that is accompanied by a phenomenon of cross-sectional reduction at the fracture site.

In contrast, when an excessive intermetallic compound layer or cracks or the like are present on a bonding surface CS of the different conductor connecting part 11, brittle fracture may occur at the different conductor connecting part 11 or the bonding surface CS, as illustrated in FIG. 4 during the tensile test in which the bonded aluminum conductor 10A and copper conductor 10B are pulled from both ends.

Here, brittle fracture is a fracture with little plastic deformation, meaning that it occurs suddenly and without any prediction.

Therefore, the fact that ductile fracture does not occur in the tensile test and brittle fracture occurs at the different conductor connecting part 11 means that the bonded strength of the different conductor connecting part 11 is insufficient, which may cause unexpected fracture during operation of the power cable, and such brittle fracture should be prevented in terms of power cable stability.

Meanwhile, it can be seen that the brittle fracture illustrated in FIG. 4 occurs at the bonding surface CS and not at the aluminum conductor region or the copper conductor region. As described above, the brittle fracture at the bonding surface CS of the different conductors bonded by resistance welding may be caused by a crack present at the different conductor connecting part 11 or by the intermetallic compound layer having a certain thickness or more.

Here, it is known that the intermetallic compound layer may be formed by diffusion due to the transfer of momentum between atoms, and that the growth rate of the intermetallic compound layer may be accelerated by increasing the diffusion rate due to the electromigration effect, which is a phenomenon of movement of matter by continuous movement of ions in a conductor caused by the transfer of momentum between conduction electrons and scattered atomic nuclei in a metal under conditions of direct current electrical application. Also, it is known that the thickness of the intermetallic compound layer produced at the bonding surfaces of different conductors grows when the connecting part of the conductors is exposed to high temperature for a long period of time. In addition, the intermetallic compound layer has the characteristic of being harder than the metal material as the parent material, resulting in increased brittleness and lower electrical conductivity at the bonding surface, and it is known that brittle fracture occurs at the connecting part of different conductors as the thickness of the intermetallic compound layer grows.

While cracking, which is one of the causes of brittle fracture, is an exceptional situation caused by poor resistance welding, the intermetallic compound layer is a constituted structure that is necessarily created when the different conductors are bonded by resistance welding, and its thickness may grow. Therefore, it is necessary to identify and manage the critical thickness of the intermetallic compound layer at which brittle fracture may occur. In addition, in the case of dynamic submarine power cables applied to offshore wind power generation, which are in high demand in recent years, the need to manage the critical thickness of the intermetallic compound layer is even more urgent as the dynamic submarine power cables are exposed to external forces generated by flowing in seawater, increasing the possibility of brittle fracture of the bonded different conductors.

Moreover, in the case of the power cable, considering that the power cable is a means of transmitting power that is continuously exposed to heat generated by energization of the conductors during the lifespan of the cable, which is typically several decades, and that the conductors are subjected to repeated elongation or contraction depending on the outside temperature, it is necessary to be able to predict or diagnose, in addition to the durability of the power cable itself, the durability depending on the effect of the intermetallic compound layer at the conductor connecting part of the interconnecting box of the power cable.

Figure 5:
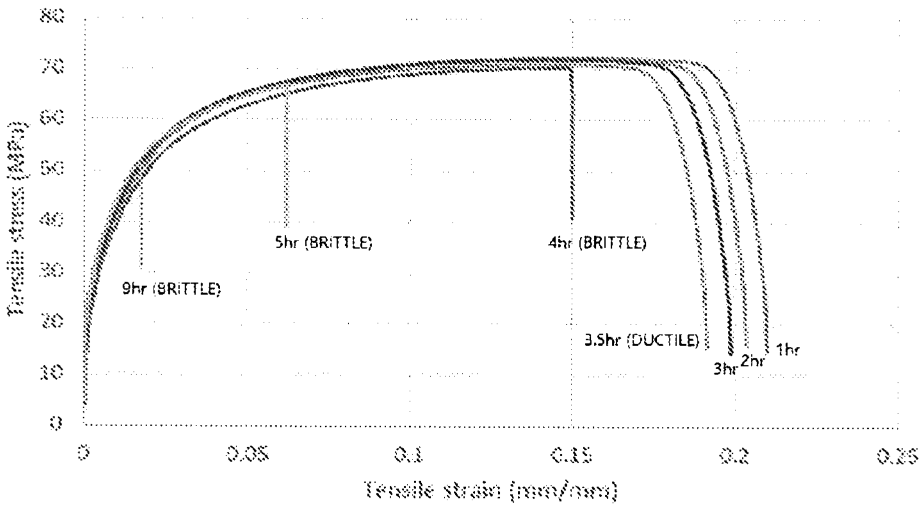
FIG. 5 illustrates the results of tensile tests performed on the conductor connecting part of the power cable with different conductors after the growth of an intermetallic compound layer by heat treatment at 400° C. for 1, 2, 3, 4, 5, and 9 hours.

FIG. 5 illustrates the results of tensile tests performed on the conductor connecting part of the power cable with different conductors after the growth of an intermetallic compound layer by heat treatment at 400° C. for 1, 2, 3, 4, 5, and 9 hours. The horizontal axis of the graph shows a tensile strain (strain, a ratio of a stretched length to an original length, in mm/mm), and the vertical axis shows a tensile stress (MPa).

Specifically, two specimens (25 cm in total length) of a conductor in which copper (SCR, 8 mm in diameter) and aluminum (Al 1070, 8 mm in diameter), which are different conductors, which is bonded by resistance welding as illustrated in FIG. 3 and confirmed to be free of cracks are prepared for each heat treatment time. One specimen for each time is cut transversely near the bonding surface to measure the thickness of the intermetallic compound layer, and FIG. 5 illustrates the results of tensile tests performed on the other specimen for each time after 1, 2, 3, 4, 5, and 9 hours of heat treatment at 400° C. (heat treatment using a furnace).

Here, the tensile test was performed by pulling both ends of the conductor in which different conductors are bonded to apply a tensile force with a marking distance of 10 cm and a tensile speed of 100 mm/min.

The results showed that for the conductor in which different conductors are bonded with the heat treatment performed at 400° C. for 1, 2, and 3 hours, the tensile stress was 70 Mpa, and the tensile strain (mm/mm) was around 0.2, indicating ductile fracture.

From the test results illustrated in FIG. 5, it can be seen that even for the specimens with ductile fracture, the strain (mm/mm) at which ductile fracture occurs is inversely proportional to the heat treatment time.

Further, the conductor with the bonded different conductors for which heat treatments of 3 and 3.5 hours at 400° C. were performed resulted in ductile fracture, while the conductor with the bonded different conductors for which heat treatment of 4 hours at 400° C. was performed resulted in brittle fracture.

In addition, it was found that the conductor with the bonded different conductors for which heat treatments of 5 and 9 hours at 400° C. were performed were all brittle fractured, and that the strain (mm/mm) at which brittle fracture occurred was inversely proportional to the heat treatment time.

In summary, these results may be interpreted to indicate that the tensile strain at which ductile fracture and brittle fracture occur is inversely proportional to the heat treatment time, and that the possibility of brittle fracture increases with increasing heat treatment time.

In addition, since the possibility of brittle fracture is proportional to the thickness of the intermetallic compound layer, it can be predicted that when the connecting part of the different conductors is bonded at high temperature and exposed for a long period of time, the intermetallic compound layer grows, increasing the possibility of brittle fracture against outside tensile forces.

Meanwhile, according to the theory introduced in the related art, it is known from the first article in the related art (Journal of alloys and compounds, M. abbassi et al., 2001) that the limit of the average (hereinafter referred to as the "average thickness") of the thickness by region of the intermetallic compound layer, which generally determines whether the intermetallic compound layer is brittle or not, is about 2.5 micrometers (μm). However, since an intermetallic compound layer of several micrometers in thickness is unavoidably generated in the course of bonding process such as welding or in the course of long-term use of the power cable system, it is necessary to provide accurate guidelines regarding the relationship between the thickness of the intermetallic compound layer generated in the course of resistance welding and power supply and the thickness of the intermetallic compound layer that can prevent brittle fracture.

Figure 6:
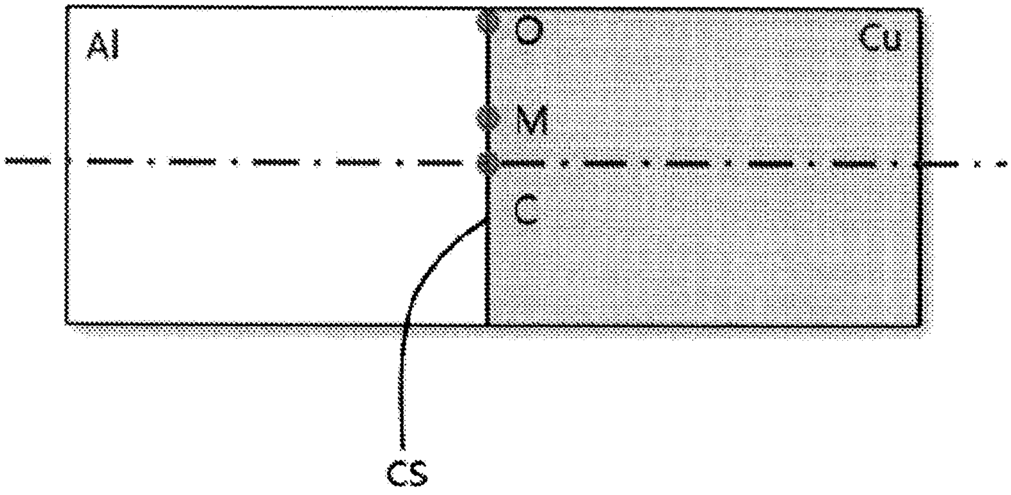
FIG. 6 illustrates a conceptual diagram for measuring an average thickness of the intermetallic compound layer by region of the different conductor connecting part.

FIG. 6 illustrates a conceptual diagram for measuring an average thickness of the intermetallic compound layer by region of the different conductor connecting part.

Since the growth tendency of the intermetallic compound layer may vary depending on the center and the outermost point of the bonding surface CS when the different conductors are bonded, in the test for measuring the average thickness of the intermetallic compound layer at the connecting part where the different conductors are bonded, the thickness of the intermetallic compound layer at a center point C, an outermost point O, and a quarter midpoint M between the center point C and the outermost point O of the bonding surface CS was measured, as illustrated in FIG. 6.

Further, the average thickness of the intermetallic compound layer is defined to mean the average of the thicknesses of the intermetallic compound layer at the center point C, the outermost point O, and the quarter midpoint M between the center point C and the outermost point O of the bonding surface CS.

It is generally known that when aluminum and copper are bonded by resistance welding, five different kinds of intermetallic compound layers are formed on the bonding surface. In this case, each layer of the intermetallic compounds that can be formed may be differentiated into $Al_2Cu(\theta)$ layer, Al2Cu(η2) layer, $Al_3Cu_4(\zeta)$ layer, $A_2Cu_3(\delta)$ layer, and $Al_4Cu_9(\gamma)$ layer according to the change of aluminum or copper content, but among them, a first layer of $Al_2Cu(\theta)$ layer, a second layer of $Al_2Cu(\eta 2)$ layer, and a third layer of $Al_4Cu_9(\gamma)$ layer are formed by heat treatment in the range of 400° C.

Figure 7:
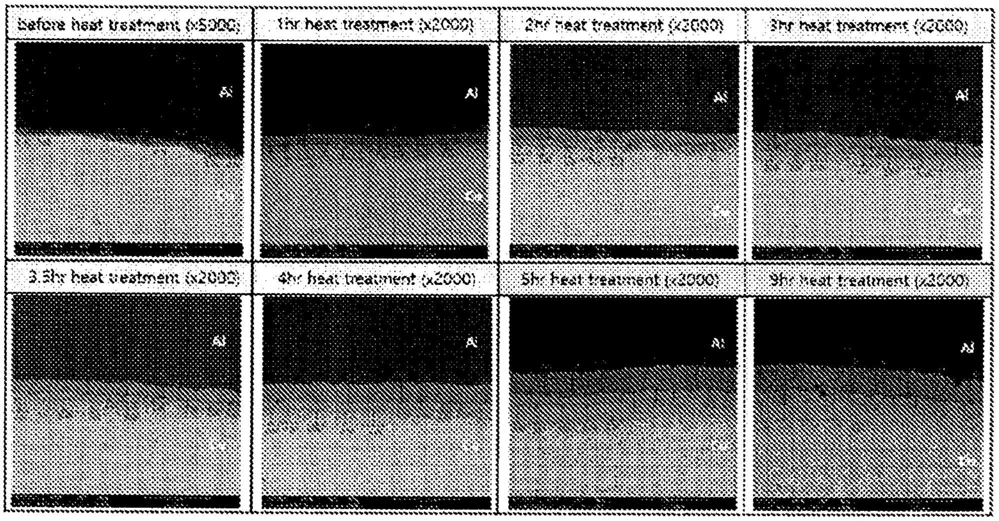
FIG. 7 illustrates an enlarged view of a center point C of a bonding surface on a cross-section of a specimen heat treated at 400° C. for 1, 2, 3, 4, 5, and 9 hours by the method described in FIG. 6 and described with reference to FIG. 5.

FIG. 7 is an enlarged view of the center point C of the bonding surface on a cross-section of the specimens subjected to 1, 2, 3, 4, 5, and 9 hours of heat treatment (heat treatment using a furnace) at 400° C. in the method illustrated in FIG. 6 and described with reference to FIG. 5. Table 1 below is a summary of the thickness data at the center point C, the midpoint M, and the outermost point O of the bonding surface of the specimen in which the tensile test was performed after 1, 2, 3, 3.5, 4, 5, and 9 hours of heat treatment (heat treatment using a furnace) at 400° C. described with reference to FIG. 5.

The average thickness of the intermetallic compound layer by region (C, M, and O) in the state without heat treatment after resistance welding of aluminum and copper conductors was only 1.3 micrometers.

Further, the average of the sum of the thicknesses of the intermetallic compound layer by region (C, M, and O) of the intermetallic compound layer was 9.7 micrometers and 9.9 micrometers for the specimen with ductile fracture (heat treatment for 3 hours at 400° C.) and the specimen with brittle fracture (heat treatment for 3.5 hours at 400° C.), which was determined to be the boundary between ductile and brittle fracture depending on the specimen. For the specimens with brittle fracture (heat treatment for 4 hours at 400° C., 5 hours at 400° C., and 9 hours at 400° C.), the average thickness of the intermetallic compound layer by region (C, M, and O) of the intermetallic compound layer was measured to be 10.2 micrometers (μm), 15.2 micrometers (μm), and 16.8 micrometers (μm), respectively.

TABLE 1

| | | BEFORE HEAT TREATMENT | | | 400° C. 1 hr HEAT TREATMENT | | | 400° C. 2 hr HEAT TREATMENT | | | 400° C. 3 hr HEAT TREATMENT | | |
|---|---|---|---|---|---|---|---|---|---|---|---|---|---|
| | | C | M | O | C | M | O | C | M | O | C | M | O |
| IMC THICKNESS (μm) | FIRST LAYER | 0.4 | 0.4 | 0.4 | 2.7 | 2.8 | 2.7 | 3.3 | 3.3 | 3.4 | 3.3 | 3.3 | 3.3 |
| | SECOND LAYER | 1.2 | 0.9 | 0.8 | 1.7 | 1.7 | 1.4 | 1.8 | 2.1 | 1.8 | 2.1 | 2.2 | 2.2 |
| | THIRD LAYER | — | — | — | 3.3 | 3.0 | 3.3 | 3.6 | 3.5 | 4.2 | 4.1 | 4.2 | 4.5 |
| | SUM | 1.6 | 1.2 | 1.2 | 7.6 | 7.6 | 7.4 | 8.7 | 8.8 | 9.4 | 9.4 | 9.8 | 10.0 |
| | AVERAGE | | 1.3 | | | 7.5 | | | 9.0 | | | 9.7 | |

| | | 400° C. 3.5 hr HEAT TREATMENT | | | 400° C. 4 hr HEAT TREATMENT | | | 400° C. 5 hr HEAT TREATMENT | | | 400° C. 9 hr HEAT TREATMENT | | |
|---|---|---|---|---|---|---|---|---|---|---|---|---|---|
| | | C | M | O | C | M | O | C | M | O | C | M | O |
| IMC THICKNESS (μm) | FIRST LAYER | 3.6 | 3.7 | 3.3 | 3.6 | 3.7 | 3.7 | 5.3 | 5.6 | 5.3 | 5.7 | 5.9 | 6.1 |
| | SECOND LAYER | 2.2 | 2.1 | 2.3 | 2.2 | 2.1 | 2.3 | 3.0 | 3.0 | 2.9 | 3.2 | 3.1 | 3.0 |
| | THIRD LAYER | 4.0 | 4.0 | 4.3 | 4.2 | 4.0 | 4.7 | 6.7 | 7.0 | 6.8 | 7.7 | 7.8 | 7.8 |
| | SUM | 9.8 | 9.9 | 10.0 | 10.0 | 9.9 | 10.7 | 15.0 | 15.5 | 15.0 | 16.6 | 16.9 | 16.9 |
| | AVERAGE | | 9.9 | | | 10.2 | | | 15.2 | | | 16.8 | |

From the results above, it was confirmed that the average thickness of the intermetallic compound layer grows with heat treatment after the aluminum and copper conductors are bonded by resistance welding, and that the critical average thickness of the intermetallic compound layer, which is the boundary between ductile and brittle fracture when a tensile force is applied to the connecting part of the conductor, is approximately 10.0 micrometers (μm).

As described above, although the first article disclosed in the related art reported that the limit of the average thickness of the intermetallic compound layer that predicts brittle fracture is 2.5 micrometers (μm), the new results were derived that the critical average thickness of the intermetallic compound layer that determines brittle fracture is 10 micrometers (μm) when other variables are excluded from consideration.

Further, in Table 1, the specimen before heat treatment shows that an intermetallic compound layer may be inevitably generated during the welding process, and the initial thickness thereof was measured to be approximately 1.3 micrometers (μm), but the average thickness of the intermetallic compound layer generated during the welding process may change depending on the diameter of the conductor. That is, it can be seen that the average thickness of the intermetallic compound layer after welding may increase as the larger diameter of the conductor increases the welding time to achieve a sufficient bonding.

Recently, in the case of power cables, the use of ultra-high voltage power cables is increasing, and the diameter of the conductor is naturally increasing accordingly, so it is necessary to take into account the initial intermetallic compound layer after bonding according to the diameter or area of the conductor.

Table 2 below shows the results of measuring the average thickness of the initial intermetallic compound layer after bonding at the joints of power cables with conductors of various diameters.

TABLE 2

| CONDUCTOR AREA OF DIFFERENT CONDUCTOR OF POWER CABLE (SQ, $mm^2$) | AVERAGE THICKNESS OF INITIAL INTERMETALLIC LAYER AFTER BONDED (μm) |
|---|---|
| 50 | 0.2 |
| 300 | 1.4 |
| 500 | 1.9 |
| 800 | 2.4 |
| 1000 | 3.0 |
| 1400 | 4.1 |
| 1800 | 5.0 |

Based on the theory in the related art that the limit of the thickness of the intermetallic compound layer predicting brittle fracture is 2.5 micrometers (μm), it can be judged that the possibility of brittle fracture is not high in the case in which the area of the connected conductors is 50 $mm^2$ to 500 $mm^2$ when the power cable having different conductors is bonded. In contrast, according to the theory in the related art, when the conductor area is 800 $mm^2$, the average thickness of the intermetallic compound layer is 2.4 micrometers (μm), so it can be considered that the possibility of brittle fracture is high in consideration of the thickness growth of the intermetallic compound layer due to cable operation, and when the diameter of the conductor is 1000 $mm^2$ or more, the average thickness of the initial intermetallic compound layer after the joint is bonded exceeds 2.5 micrometers (μm), so it can be considered that the possibility of brittle fracture is high. Therefore, based on the theory in the related art, it can be judged that in the case of the diameter of the conductor being 800 $mm^2$ or more, the joint of the power cable bonded by resistance welding has a high risk of brittle fracture, which makes it difficult to use the power cable of different conductors, or the design of the joint needs to be changed. However, based on the experimental results of the present disclosure, it can be concluded that the average thickness of the initial intermetallic compound layer after bonding of the joint is not more than 10 micrometers (μm) in all cases where the area of the conductor is from 50 $mm^2$ to 1800 $mm^2$, and thus the possibility of brittle fracture in use is not high.

Therefore, as described above, in the present disclosure, when the critical average thickness of the intermetallic compound layer at the joint after the different conductors are bonded to prevent brittle fracture is 10 μm or less, it can be determined that the risk of brittle fracture of the joint is not significant even when the intermetallic compound layer with a thickness exceeding the conventionally known critical thickness of 2.5 μm is confirmed or predicted, thus minimizing unnecessary waste of costs such as shortening the durable lifespan in consideration of brittle fracture or making separate design changes to prevent the brittle fracture.

In the test examples illustrated in FIGS. 2 to 7, the aluminum conductor and the copper conductor are circular bars, but since a circularly compressed conductor in which a plurality of strands are circularly compressed is generally applied to the power cable, a process of connecting the aluminum conductor and the copper conductor in the form of a circularly compressed conductor of the power cable will be described in FIG. 8 and following.

Depending on the environment in which the power cable is laid (land or seabed, etc.), the suitability of the conductors may change in consideration of cost, etc. Depending on the characteristics of the conductors of the power cable required for each section, intermediate connections may be performed even when the types of conductors constituting the power cable are different.

FIGS. 8 to 13 illustrate a conceptual diagram of a process in which a space factor of the bonding surface of the copper circular compressed conductor as the first conductor 10A is processed to be higher than a predetermined size, and an image during the process.

The first conductor may be a circularly compressed conductor in which a plurality of stranded conductors of copper or a copper alloy material are circularly compressed, and the second conductor may be a circularly compressed conductor in which a plurality of stranded conductors of aluminum or an aluminum alloy material having a relatively low melting point are circularly compressed. In the case of resistance welding of the first conductor and the second conductor, due to the low melting point of the second conductor, the quality of the connecting part may be deteriorated due to the existence of voids on the bonding surface of the first conductor and the formation of a thick oxide film along each of the voids in the process of welding at a temperature between the melting point of the first conductor and the melting point of the second conductor.

Therefore, in the present disclosure, a process may be performed in which the space factor of the bonding surface of the first conductor 10A having a high melting point is processed to be higher than a predetermined size before the first and second conductors, which are each constituted as circular compressed conductors, are resistance welded.

That is, the bonding surface of the first conductor constituted as a circular compressed conductor may be provided in the form in which voids and the like are eliminated or minimized, thereby suppressing the occurrence of an oxide film and the like that may occur when welding, thereby improving the bonding quality of the connecting part bonded by a method such as welding. Therefore, even when the plurality of stranded conductors are circularly compressed by reducing the voids on the bonding surface of the circular compressed conductor, the bonding surface may be made conductive, such as the first conductor illustrated in FIGS. 2 to 7.

Here, a space factor of a conductor constituting a power cable means a ratio of an area of strands to an area according to an outer diameter of a conductor composed of a plurality of stranded conductors, in which a larger space factor means less empty space in a cross-section of the conductor, and a space factor of 100% may be interpreted to mean a state of having no empty space.

Therefore, the processing of the space factor of the first conductor of the present disclosure to be a predetermined size or higher means a process that reduces the lateral empty space ratio of the first conductor constituted as a copper circular compressed conductor to a predetermined size or less.

The process of processing the space factor of the bonding surface of the first conductor to be a predetermined size or higher is described in detail.

Figure 8:
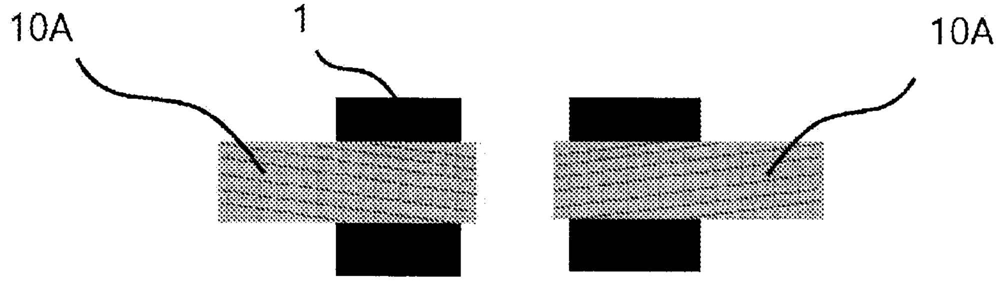
FIG. 8 illustrates a copper circular compressed conductor as a pair of first conductors, each mounted in a welding jig.
Figure 9:
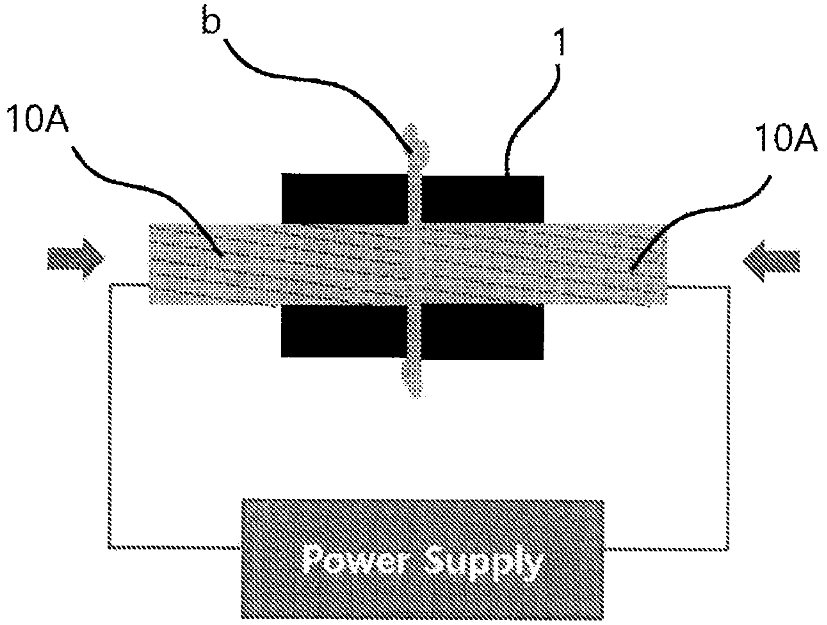
FIG. 9 illustrates a process of bonding surfaces of the pair of first conductors by resistance welding.
Figure 10:
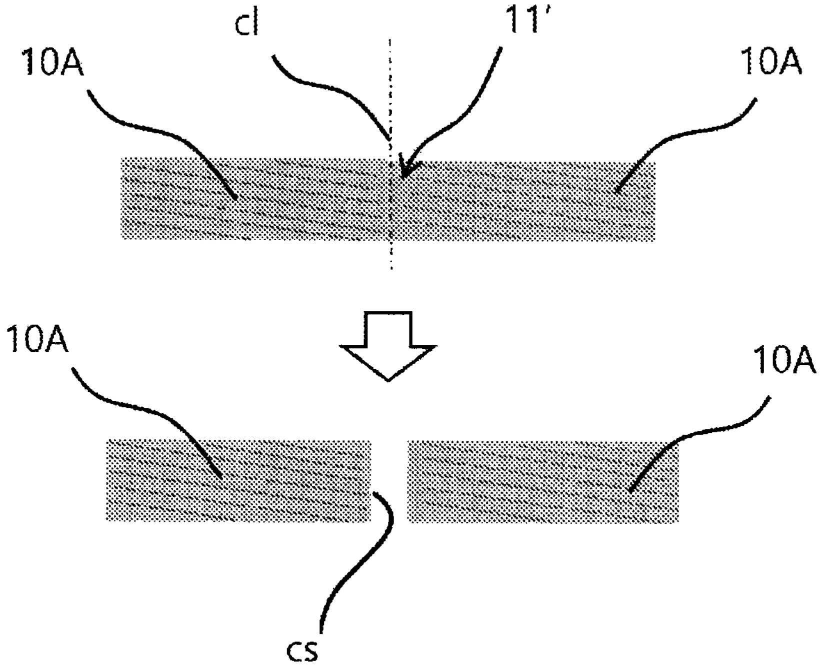
FIG. 10 illustrates a process of removing burrs from the connecting part of the bonded first conductor and cutting the connecting part along a cutting line.

FIG. 8 illustrates a copper circular compressed conductor as the pair of first conductors 10A, each in the state of being mounted on a welding jig 1, FIG. 9 illustrates a process of bonding the bonding surfaces of the pair of first conductors 10A by resistance welding, and FIG. 10 illustrates a process of removing burrs b from a connecting part 11' of the bonded first conductors 10A and boundary cutting a cutting line cl of the connecting part 11'.

The welding of the bonding surface of the pair of first conductors 10A may be accomplished by, but is not limited to, fusion resistance welding.

Figure 11:
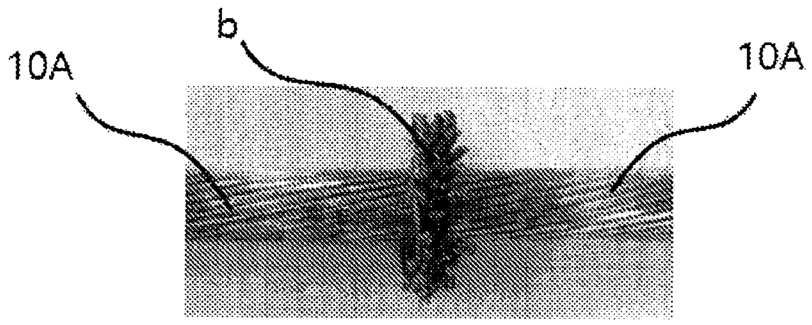
FIG. 11 illustrates a state in which the pair of first conductors as copper circular compressed conductors are bonded.
Figure 12:
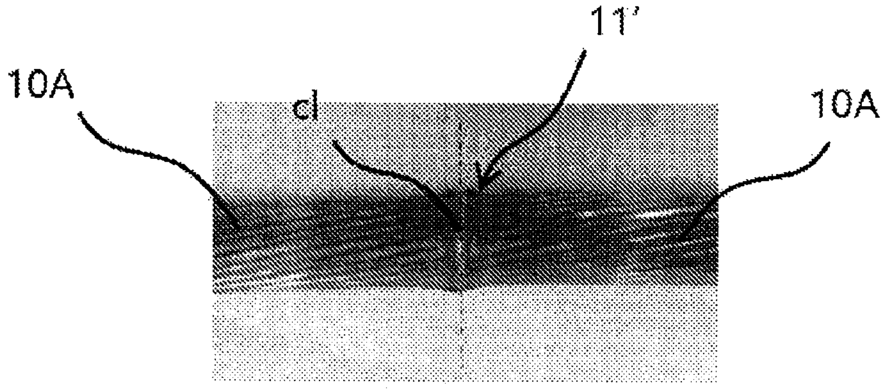
FIG. 12 illustrates a state in which the burrs have been removed from the connecting part of the first conductor.
Figure 13:
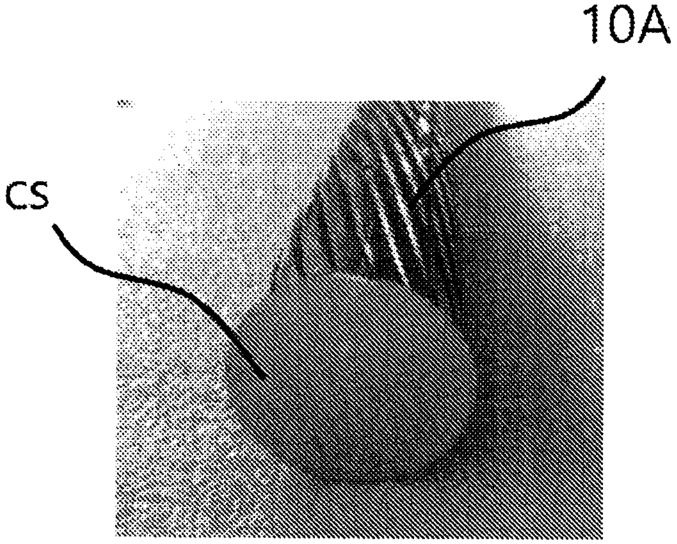
FIG. 13 illustrates a new bonding surface of the first conductor formed by cutting the connecting part of the pair of first conductors.

FIG. 11 illustrates a state in which the pair of first conductors 10A as a copper circular compressed conductor is bonded, FIG. 12 illustrates a state in which the burrs b have been removed from the connecting part 11' of the first conductors 10A, and FIG. 13 illustrates a new bonding surface CS of the first conductors 10A formed by cutting the connecting part 11' of the pair of first conductors 10A.

As illustrated in FIG. 11, the pair of first conductors 10A are welded and recrystallized to form the burrs b during the compression process, such as by fusion resistance welding, and when the recrystallized connecting part 11' is cut, the cut surface of the connecting part 11' of the first conductors 10A may be processed into a smooth metal surface with few voids present in the circular compressed conductor, as illustrated in FIG. 13.

As described above, the process of processing the space factor of the bonding surface CS of the first conductor 10A having a high melting point among the first conductor and the second conductor to be bonded to a predetermined size or higher can be considered as a process of conducting the circular compressed conductor in the bonded area.

Further, as for the processed of processing the space factor of the bonding surface of the first conductor 10A to be a predetermined size or higher, in addition to the method of bonding the pair of identical first conductors 10A and cutting the connecting part 11' as illustrated in FIGS. 8 to 13, a method of recrystallizing the bonding surface of the first conductor 10A by heating the bonding surface of the first conductor 10A with a heating jig or the like having a melting point higher than the melting point of the first conductor 10A may be used.

As illustrated in FIG. 13, the new bonding surface CS of the first conductor 10A formed by cutting the connecting part 11' of the pair of first conductors 10A is shown to constitute a smooth surface with a space factor of nearly 100%. However, in the test results, it was found that when the space factor of the new bonding surface of the first conductor 10A is approximately 98% or more, which is higher than the space factor of a typical circular compressed conductor, no quality problem of the connecting part 11' bonded by resistance welding with the aluminum circular compressed conductor occurs.

FIGS. 14 to 19 illustrate a bonding process of aluminum circular compressed conductors as the first conductor 10A and the second conductor 10B, which are processed so that the space factor of the bonding surface is higher than a predetermined size or the voids are minimized on the bonding surface, and images during the bonding process.

Figure 14:
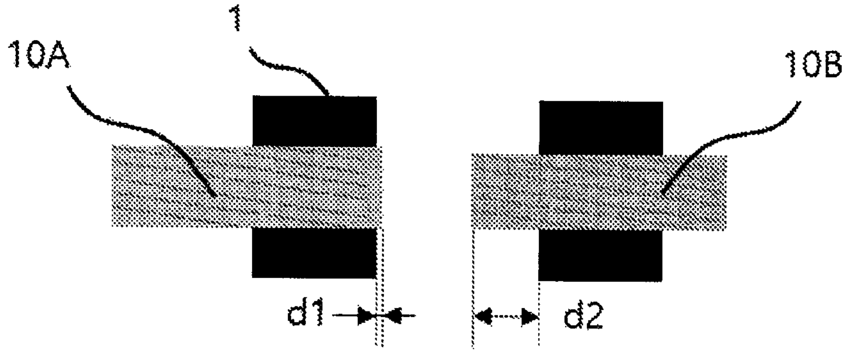
FIG. 14 illustrates a copper circular compressed conductor as the pair of first conductors and an aluminum circular compressed conductor as a second conductor, each in a state of being mounted on a welding jig.
Figure 15:
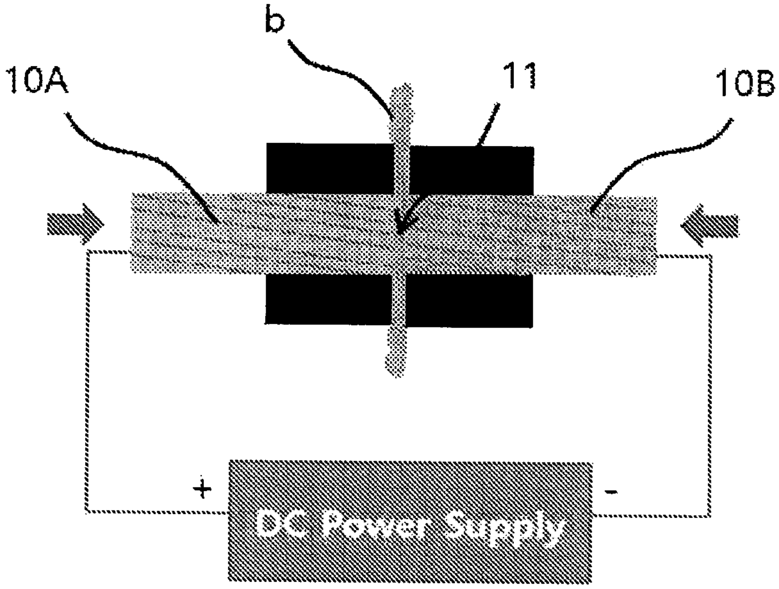
FIG. 15 illustrates a process in which the bonding surfaces of the first conductor and the second conductor are bonded by resistance welding.
Figure 16:
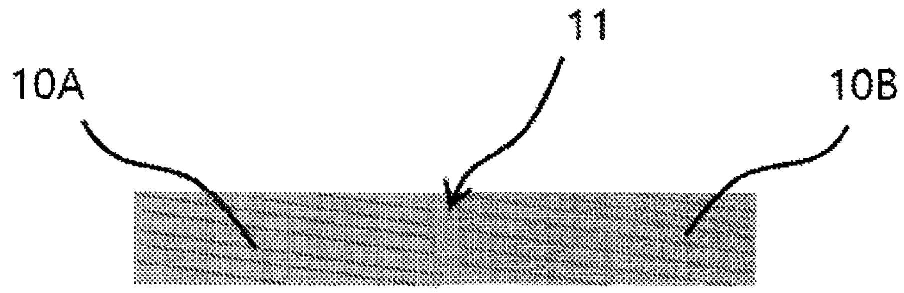
FIG. 16 illustrates a state in which burrs have been removed from the connecting part of the bonded first and second conductors and the bonding has been completed.

Specifically, FIG. 14 illustrates a state in which a pair of copper circular compressed conductors 10A as the first conductor 10A and an aluminum circular compressed conductor 10B as the second conductor 10B are each mounted on the welding jig 1, FIG. 15 illustrates a process in which the bonding surfaces of the first conductor 10A and the second conductor 10B are bonded by resistance welding, and FIG. 16 illustrates a state in which the burrs b are removed from the connecting part 11 of the bonded first conductor 10A and the second conductor 10B and the bonding has been completed.

As illustrated in FIG. 14, when the respective first conductor 10A and second conductor 10B are brought into contact and energized in the state of being mounted in the welding jig 1, melting of the conductors proceeds near the contact surface, at which time, as illustrated in FIG. 8, the burrs b are formed when the two conductors are pressed in the direction of contact, and the connecting part 11 may be formed around the bonding surface.

As a welding method for bonding the first conductor 10A and the second conductor 10B illustrated in FIG. 15, fusion resistance welding (e.g., upset butt welding) may be used. The fusion resistance welding is a bonding method that uses joule heat through current energization as a direct heat source for heating the connecting part 11 and melting the material, and in the case of the fusion resistance welding of the present disclosure, may be configured with an energization heating process through current supply and a pressing process in which the conductor is pressed when starting to melt at a connecting part interface.

Further, as illustrated in FIG. 14, the first conductor 10A and the second conductor 10B may have different exposed lengths in the bonded direction while mounted on their respective welding jigs 1.

When the first conductor 10A and the second conductor 10B are contacted and energized by the fusion resistance welding method, it may be advantageous to improve the quality of the connecting part 11 by first or more melting the second conductor 10B made of an aluminum material having a lower melting point than the first conductor 10A, which has been processed to have a higher space factor on the bonding surface to a predetermined size.

Therefore, as illustrated in FIG. 14, it is preferred that an exposed length d2 of the second conductor 10B is configured to be longer than an exposed length d1 of the first conductor 10A. Specifically, the exposed length d2 of the second conductor 10B may be configured to be equal to or greater than two times, preferably ten times, the exposed length d1 of the first conductor 10A, and the bonding surface of the second conductor 10B in the state in which the bonding has been completed may also be minimally void, as is the case with the conductor.

The second conductor 10B may be aluminum or an aluminum alloy, which has a lower melting point and a larger exposed length in the welding jig than the first conductor 10A made of copper, so that the second conductor 10B may be sufficiently melted to be uniformly bonded at the connecting part 11 even when welded in the state of a circular compressed conductor.

Further, as illustrated in FIG. 16, after the bonding has been completed, the bonded structure of the conductor may be completed by removing the burrs B on the outer circumferential surface of the connecting part 11.

Figure 17:
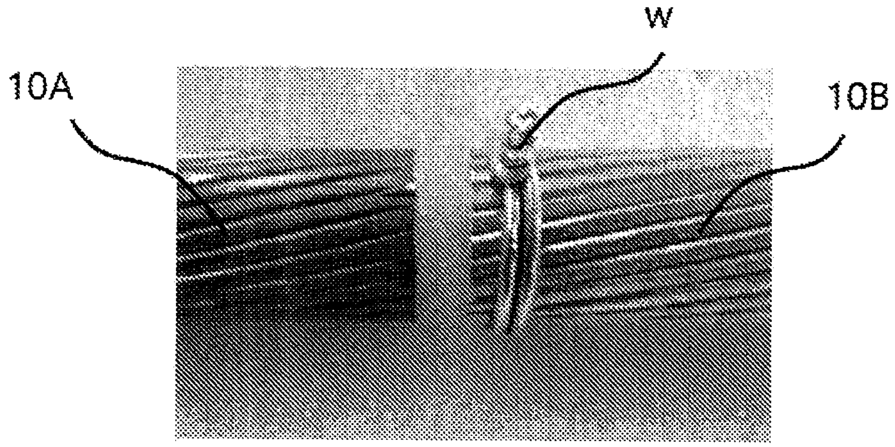
FIG. 17 illustrates the first conductor processed to have a high space factor on the bonding surface and a second conductor comprising an aluminum stranded wire bonded to the first conductor.
Figure 18:
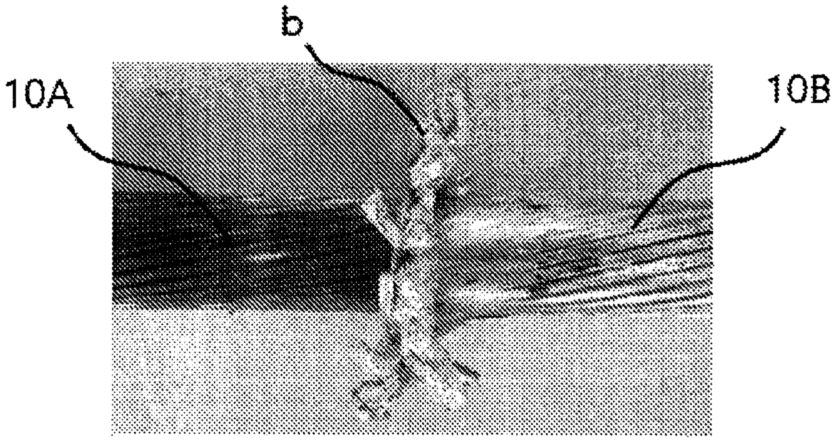
FIG. 18 illustrates the first and second conductors bonded by fusion resistance welding.
Figure 19:
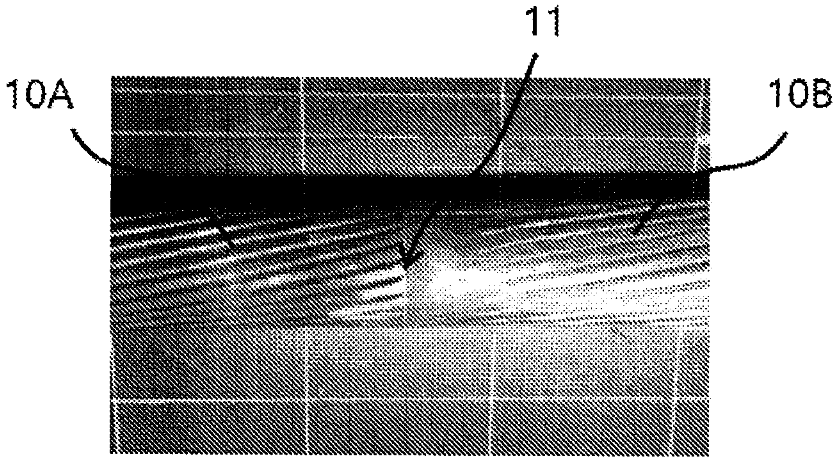
FIG. 19 illustrates a conductor connecting part structure with burrs removed from the connecting part of the bonded first and second conductors.

FIG. 17 illustrates the first conductor 10A processed with a high space factor on the bonding surface and the second conductor 10B constituted of an aluminum stranded wire bonded with the first conductor 10A, FIG. 18 illustrates the first conductor 10A and the second conductor 10B bonded by fusion resistance welding, and FIG. 19 illustrates the bonded structure of the conductor with the burrs b provided at the connecting part 11 of the first conductor 10A and the second conductor 10B which are bonded.

The first conductor 10A is in a state in which the space factor of the bonding surface is processed to be a predetermined size or higher, and the length exposed for bonding in the welding jig 1 is shorter than the second conductor 10B. However, since the second conductor 10B is constituted as a circular compressed conductor and has a long exposed length in the welding jig 1, in order to prevent that the spreading of the circular compressed conductor may occur during fusion resistance welding, the operation may be performed in a state in which an end of the second conductor 10B is fixed with an aluminum wire W or the like, as illustrated in FIG. 17. The wire W may be removed along with the burrs b during the compression process of fusion resistance welding or during the removal process of the burrs b, resulting in the bonded structure of the different metal conductors as illustrated in FIG. 12.

As described above, even when the circular compressed conductors illustrated in FIGS. 8 to 19 are bonded, in the case of the first conductor made of copper, the bonding surface is flattened by minimizing voids, and in the case of the second conductor made of aluminum or aluminum alloy, the bonding surface may be flattened during the bonding process because of a lower melting point than the first conductor. Therefore, the method of determining whether brittle fracture occurs due to a tensile force applied to the connecting part of different conductors based on the test results with the circular bar conductors examined with reference to FIGS. 2 to 7 may be applied in the same manner.

While the present disclosure has been described above with reference to the exemplary embodiments, it may be understood by those skilled in the art that the present disclosure may be variously modified and changed without departing from the spirit and scope of the present disclosure disclosed in the claims. Therefore, it should be understood that any modified embodiment that essentially includes the constituent elements of the claims of the present disclosure is included in the technical scope of the present disclosure.

The invention claimed is:

1. A power cable system comprising a cable connection part in which a first power cable and a second power cable are connected, the power cable system comprising:

a first conductor constituting the first power cable, made of copper or a copper alloy material;

a second conductor constituting the second power cable, the second conductor being made of aluminum or an aluminum alloy material different from the first conductor; and a different conductor connecting part, wherein the first conductor and the second conductor are bonded by resistance welding, wherein the different conductor connecting part includes an intermetallic compound layer formed as a result of a material migration phenomenon at bonding surfaces of the first conductor and the second conductor, and wherein an average thickness of the intermetallic compound layer is greater than 2.5 μm and less than or equal to 10 μm, which is a critical average thickness at which brittle fracture occurs in a tensile test, wherein the average thickness of the intermetallic compound layer is measured as an average of thicknesses of the intermetallic compound layer at a center point, an outermost point, and a quarter midpoint between the center point and the outermost point of the bonding surface of the first conductor and the second conductor.

2. The power cable system of claim 1, wherein the intermetallic compound layer includes at least one of an $Al_2Cu$ layer, an AlCu layer, an $Al_2Cu_3$ layer, and an $Al_4Cu_9$ layer.

3. The power cable system of claim 1, wherein a cross-sectional area of the conductor at the connecting part of the first conductor and the second conductor is equal to or greater than 800 $mm^2$.

4. The power cable system of claim 1, wherein the first conductor and the second conductor are circular compressed conductors or flat conductors with a plurality of strands compressed into a circular shape.

5. The power cable system of claim 4, wherein the first conductor is bonded with the second conductor in a state where the connecting part is cut to remove voids in the bonding surface after homogeneous conductors are bonded.

* * * * *